United States Patent
Dey et al.

(10) Patent No.: US 8,332,256 B2
(45) Date of Patent: Dec. 11, 2012

(54) SOCIAL NETWORK MARKETING PLAN MONITORING METHOD AND SYSTEM

(75) Inventors: Kuntal Dey, West Bengal (IN); Natwar Modani, New Delhi (IN); Amit Anil Nanavati, New Delhi (IN); Subramanya Kabbinahithlu Narayana Prasad, Bangalore (IN); Zheng Zhu, Bridgewater, NJ (US)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 12/685,170

(22) Filed: Jan. 11, 2010

(65) Prior Publication Data

US 2011/0173051 A1 Jul. 14, 2011

(51) Int. Cl.
*G06Q 10/00* (2012.01)
(52) U.S. Cl. ...................................... 705/7.29; 705/7.39
(58) Field of Classification Search ................... 705/7.29
See application file for complete search history.

(56) References Cited

U.S. PATENT DOCUMENTS

| | | | |
|---|---|---|---|
| 6,286,005 | B1 | 9/2001 | Cannon |
| 7,080,027 | B2 | 7/2006 | Luby et al. |
| 7,526,434 | B2 | 4/2009 | Sharp |
| 2001/0020236 | A1 | 9/2001 | Cannon |
| 2006/0218008 | A1 | 9/2006 | Cole |
| 2007/0016435 | A1 | 1/2007 | Bevington |
| 2008/0033758 | A1 | 2/2008 | Keeley |
| 2008/0033809 | A1 | 2/2008 | Black et al. |
| 2008/0046317 | A1* | 2/2008 | Christianson et al. .......... 705/14 |
| 2008/0086369 | A1 | 4/2008 | Kiat et al. |
| 2008/0104225 | A1 | 5/2008 | Zhang et al. |
| 2008/0247534 | A1 | 10/2008 | Steul |
| 2009/0063284 | A1 | 3/2009 | Turpin et al. |
| 2009/0064025 | A1 | 3/2009 | Christ et al. |
| 2009/0144075 | A1 | 6/2009 | Flinn et al. |
| 2009/0182618 | A1* | 7/2009 | Higgins et al. .................. 705/10 |
| 2009/0204482 | A1* | 8/2009 | Reshef et al. ................... 705/10 |
| 2010/0306043 | A1* | 12/2010 | Lindsay et al. ............ 705/14.41 |
| 2011/0153421 | A1 | 6/2011 | Novikov et al. |

FOREIGN PATENT DOCUMENTS

| | | |
|---|---|---|
| WO | WO2007109726 | 9/2007 |
| WO | WO2008042812 | 4/2008 |
| WO | WO2008083388 | 7/2008 |

OTHER PUBLICATIONS http://www.sdmet.com/article6.html; Using the Value Equation to Evaluate Campaign Effectiveness; 8 pages.

(Continued)

*Primary Examiner* — Beth V Boswell
*Assistant Examiner* — Adrian McPhillip
(74) *Attorney, Agent, or Firm* — Schmeiser, Olsen & Watts; John Pivnichny

(57) ABSTRACT

A monitoring method and system. The method retrieving by a computer, first data associated with a marketing plan associated with social networks and second data associated with marketing plan objectives. The computer processor identifies social network effects associated with the marketing plan objectives, business key performance indicators (KPIs) associated with the marketing plan objectives, and social network KPIs associated with the associated social network effects. The computer processor represents a marketing plan measurement model comprising a mathematical relationship between the business KPIs and the social network KPIs. The computer processor monitors changes associated with the business KPIs and the social network KPIs and generates and stores a report indicating the changes.

15 Claims, 8 Drawing Sheets

OTHER PUBLICATIONS http://digitaldiplomacy.fco.gov.uk/en/campaigns/; 14 pages.
http://people.brunel.ac.uk/~mastjjb/jeb/or/dea.html; 30 pages.
Promotion; pp. 449-450.
Microsoft TechNet; SQL Server 2008 Books Online (Jun. 2009); Key Performance Indicators (KPIs); 3 pages.
Science Direct; Quantitative relationships between key performance indicators for supporting decision-making processes; Computers in Industry; vol. 60, Issue 2, Feb. 2009; 3 pages.
A Statistical Measure of a Population's Propensity to Engage in Post-Purchase Online Word-of-Mouth; Dellarocas et al.; 2006, vol. 21, No. 2, 277-285.
Network-Based Marketing: Identifying Likely Adopters via Consumer Networks; Hill et al.; 2006, vol. 21, No. 2, 256-276.
Evaluation of Key Performance Indicators; Rob Pearson; 4 pages.
Tools; 3 pages.
Quantitative relationships between key performance indicators for supporting decision-making processes http://www.sciencedirect.com/science?_ob=ArticleURL&_udi=B6V2D-4V1D7JJ-1&_user=10&_rdoc=1&_fmt=&_orig=search&_sort=d&view=c&_acct=C000050221&_version=1&_urlVersion=0&_userid=10&md5=add08e88f78ebaee0ddb86404602e884; (no attachment).
Patent application; Dey et al.; Social Network Marketing Plan Comparison Method and System; U.S. Appl. No. 12/685,206.
Notice of Allowance (Mail Date Jun. 13, 2012) for Patent U.S. Appl. No. 12/685,206, filed date Jan. 11, 2010; Confirmation No. 6909.
Office Action (Mail Date Jan. 10, 2012) for U.S. Appl. No. 12/685,206, filed Jan. 11, 2010; Confirmation No. 6909.

* cited by examiner

SOCIAL NETWORK MARKETING PLAN MONITORING METHOD AND SYSTEM

This application is related to application Ser. No. 12/685,206 filed on Jan. 11, 2010.

FIELD OF THE INVENTION

The present invention relates to a method and associated system for measuring and monitoring a social network marketing plan.

BACKGROUND OF THE INVENTION

Monitoring various processes typically comprises an inefficient process with little flexibility. Accordingly, there exists a need in the art to overcome at least some of the deficiencies and limitations described herein above.

SUMMARY OF THE INVENTION

The present invention provides a method comprising: retrieving, by a computer processor of a computing system, first data associated with a marketing plan associated with social networks; receiving, by the computer processor, second data associated with marketing plan objectives; identifying, by the computer processor based on the first data and the second data, social network effects associated with the marketing plan objectives; identifying, by the computer processor, business key performance indicators (KPIs) associated with the marketing plan objectives; identifying, by the computer processor, social network KPIs associated with the associated social network effects; representing, by the computer processor, a marketing plan measurement model comprising a mathematical relationship between the business KPIs and the social network KPIs; monitoring, by the computer processor, changes associated with the business KPIs and the social network KPIs; generating, by the computer processor, a report indicating the changes; and storing, by the computer processor, the report.

The present invention provides a computing system comprising a computer processor coupled to a computer-readable memory unit, the memory unit containing instructions that when enabled by the processor implement a monitoring method comprising; retrieving, by the computer processor, first data associated with a marketing plan associated with social networks; receiving, by the computer processor, second data associated with marketing plan objectives; identifying, by the computer processor based on the first data and the second data, social network effects associated with the marketing plan objectives; identifying, by the computer processor, business key performance indicators (KPIs) associated with the marketing plan objectives; identifying, by the computer processor, social network KPIs associated with the associated social network effects; representing, by the computer processor, a marketing plan measurement model comprising a mathematical relationship between the business KPIs and the social network KPIs; monitoring, by the computer processor, changes associated with the business KPIs and the social network KPIs; generating, by the computer processor, a report indicating the changes; and storing, by the computer processor, the report.

The present invention advantageously provides a simple method and associated system capable of monitoring various processes.

DETAILED DESCRIPTION OF THE INVENTION

Figure 1:
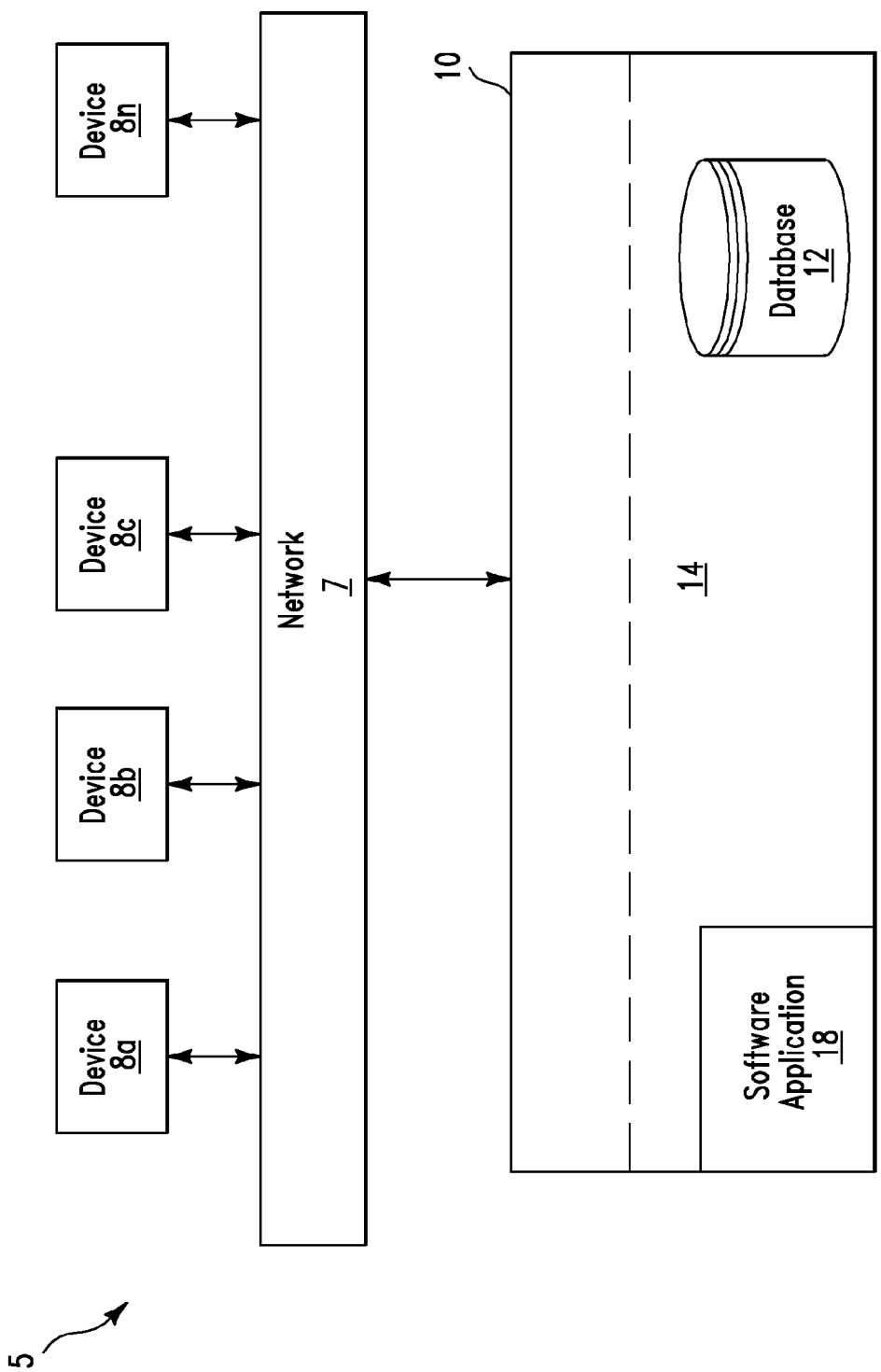
FIG. 1 illustrates a system for measuring and monitoring a social network marketing plan, in accordance with embodiments of the present invention.

FIG. 1 illustrates a system 5 for measuring and monitoring a social network marketing plan, in accordance with embodiments of the present invention. System 2 enables a method for identifying social network key performance indicators (KPI) and business KPIs that are associated with a social network marketing plan. Additionally, system 2 generates a model representing a relationship between the social network KPIs and the business KPIs. A social network is defined herein as a social structure comprising individuals (or organizations) that may be referred to as nodes. The nodes are connected to each other by one or more specific types of interdependency such as, inter alia, friendship, family, interests, beliefs, knowledge, etc. A social network may comprise any type of devices linked together including, inter alia, a telephone network, a computer network, etc. A KPI is defined herein as a tool allowing an organization to define and measure progress towards organizational goals. A KPI comprises a number used to measure and express business impacts in terms of financial and social network parameters.

System 5 of FIG. 1 comprises devices 8a . . . 8n connected through a network 7 to a computing system 10. Network 7 may comprise any type of network including, inter alia, a telephone network, a cellular telephone network, a local area network, (LAN), a wide area network (WAN), the Internet, etc. Devices 8a . . . 8n may comprise any type of devices capable of implementing a social network including, inter alia, a telephone, a cellular telephone, a digital assistant (PDA), a video game system, an audio/video player, a personal computer, a laptop computer, a computer terminal, etc. Each of devices 8a . . . 8n may comprise a single device or a plurality of devices. Devices 8a . . . 8n are used by end users for communicating with each other and computing system 10. Computing system 10 may comprise any type of computing system(s) including, inter alia, a personal computer (PC), a server computer, a database computer, etc. Computing system 10 is used to measure and monitor a social network marketing plan implemented using devices 8a . . . 8n. Computing system 10 comprises a memory system 14. Memory system 14 may comprise a single memory system. Alternatively, memory system 14 may comprise a plurality of memory systems. Memory system 14 comprises a software application 18 and a database 12. Database 12 comprises all retrieved and calculated associated with measuring and monitoring a social network marketing plan. Software application 18 enables a method to measure and monitor a social network marketing plan. Software application 18 enables a four phase process for aligning a social network effect based marketing plan with business goals as follows:

1. An identification phase that identifies a social network marketing plan objectives, intended social network effects (i.e., associated with marketing plan objectives), etc. A social network effect is defined herein effects observed in social networks of people as direct and indirect effects of announcing and implementing marketing plans. The objectives are well-defined on behalf of the marketing plan owner company and their stakeholders and may be optionally announced to the people.
2. A formulation phase that identifies appropriate business KPIs for each marketing plan objective and network KPIs for each intended social network effect.
3. An association phase that organizes business and network KPIs and specifies their relationship in a marketing plan measurement model.
4. A monitor phase that gathers data for each previously identified network KPI, calculates business KPIs, and highlights any KPI that violates tolerance thresholds (i.e., changes associated with business KPIs and social network KPIs effected by a marketing plan). Additionally, the monitor phase specifies formal notations for the marketing plan measurement model in order to: represent KPI entities, represent relationships, and represent different relationship types.

Software application 18 additionally formal notations for a marketing plan measurement model in order to represent: KPI entities, relationships, different relationship types, etc. The marketing plan measurement model may be used monitor:

1. Emergence (or vanishing) of intended/predicted social network effects (i.e., predicted elemental, structural, and behavioral changes in a social network with respect to a given marketing plan or a given set of marketing plans).
2. Emergence (or vanishing) of unintended/unpredicted social network effects.
3. A top-down analysis comprising changes in financial metrics root-caused to network effects.
4. A bottom-up analysis comprising estimated implications of network effects on financial metrics.

Each of the four stages (i.e., identification phase, formulation phase, association phase, and monitor phase) enabled by software application 18 are described in detail as follows:

Identification Phase

During the identification phase, software application 18 identifies data associated with a business, marketing plan components (i.e., social network structures, behavior KPIs, and financial KPIs associated with a given marketing plan), and a social network associated with the business.

1. Business data
   a. Identify marketing plan objectives.
   b. List a marketing plan budget.
   c. List a marketing plan duration.
   d. List stakeholders and roles.
   e. Identify stakeholder's success criteria for the marketing plan.
2. Marketing plan components data
   a. List marketing plan's components (product/service/bundle).
   b. Identify component characteristics.
   c. Identify target market segment.
   d. Identify similar products (from same/different) merchant for same segment.
3. Social network data
   a. List predicted social network effects.
   b. List an expected time for the social network effects to emerge.
   c. List an expected time period duration associated with the social network effects.
   d. List expected risks for the social network.

The following implementation example describes implementation of the identification phase. In this example, a marketing plan objective comprises increasing a number of subscribers (i.e., for a telecom network A) retrieved from a second telecom network B by offering an incentive to existing subscribers (i.e., of the telecom network A) to enroll subscribers of the telecom network B in the telecom network A. Marketing plan component features (i.e., the incentive) comprise offering an existing member M (i.e., for each new subscriber N that existing member M brings in to telecom network A from telecom network B):

A. A 50% discount on all calls that existing member M makes to new subscriber N.
B. A 10% discount on all calls that existing member M makes to people associated with new subscriber N.
C. A 2% discount on all other calls.

Formulation Phase

During the formulation phase, software application 18 identifies business KPIs and social network KPIs.

1. Business KPIs
   a. List business success criteria (i.e., from the identification phase).
   b. Identify one or more KPI for each criteria.
   c. Decompose each high level KPI to other business KPIs/metrics.
   d. Derive formulas to express each KPI in terms of lower level KPIs.
2. Social network KPIs
   a. List predicted social network effects (i.e., from the identification phase).
   b. Identify one or more KPI to measure each social network effect.
   c. Identify a data source to measure each KPI.
   d. Define an algorithm to calculate each KPI.
   e. Combine multiple network KPIs to form higher level KPIs.
   f. Derive formulas to express each higher level network KPI in terms of lower level KPIs.

The following implementation example describes implementation of the formulation. In this example, identifies appropriate business KPIs (and expectations) and social network KPIs (and expectations) associated with increasing a number of subscribers (i.e., for a telecom network A) retrieved from a second telecom network B by offering an incentive to existing subscribers (i.e., of the telecom network A) to enroll subscribers of the telecom network B in the telecom network A.

Business KPIs and Expectations
A. Increased call minutes.
B. Increase in total revenue.
C. Increased ARPU.
D. Reduced interconnection charges.
Network KPIs and Expectations
A. Social Networks evolving to denser patterns.
B. Number of nodes must remain the same (Foreign subscribers in the social network switch from telecom network B to telecom network A) or must see an increase (new subscribers take up connection to social network A).
C. Increased weight of edges between nodes (i.e., increased number of calls)
D. Reduced participation of foreign subscribers in subscriber M's social network.

Association Phase

During the association phase, software application 18: associates business KPIs with social network KPIs, Identifies types of relationships between KPIs, and calculate variance thresholds for KPIs.
1. Associate business and social network KPIs
   a. Represent each social network and business KPI in a marketing plan measurement model.
   b. Derive formulas to express each lowest business KPIs with a highest network KPI
2. Identify types of relationships between KPIs
   a. Fixed relationships comprising a pair of KPIs equivalent to each other.
   b. Proportional relationships comprising a pair of KPIs that change linearly with each other.
   c. Variable relationships comprising a KPI that changes with a change in another KPI.
   d. Expression relationships comprising a KPI that may be expressed in terms of a mathematical formula that comprises other KPIs.
3. Calculate variance thresholds
   a. Starting from a top-most business criteria, calculate each business and social network KPI.
   b. Starting from top-most business criteria, define a variance threshold for each business and social network KPI.

Monitor Phase

During the monitor phase, software application 18: calculates business KPI values (a bottom-up analysis comprising estimating implications of network effects on financial metrics) and compares variance thresholds or calculates social network KPI values (a top-down analysis comprising changes in financial metrics root-caused to social network effects) and compares variance thresholds.
1. Calculate Business KPI Values
   a. Using a network monitor tool (e.g., software application 18) to measure values of each social network KPI.
   b. Enter measured values (for each social network KPI) in a marketing plan measurement model.
   c. Using relationships identified in the association phase, derive all remaining social network and Business KPIs in the marketing plan measurement model.
2. Calculate social network KPI Values.
   a. Measure values of each business KPI (i.e., using financial reporting tools).
   b. Enter measured values (for each business KPI) in a marketing plan measurement model.
   c. Using relationships identified in the association phase, derive all remaining business and social network KPIs. The aforementioned method for calculating social network KPI Values may result in multiple combinations of values for all derived KPIs. In these cases, additional KPI measurements are taken to reduce a number of combinations to a minimum.
3. Compare variance thresholds and generate alerts
   a. In a completed marketing plan measurement model, compare measured value of each KPI against a respective variance threshold. If a measured value is greater than or less than a min/max threshold, then a user is alerted. Additionally, corrective actions associated with results of the comparison process may be enabled. The following corrective actions may be enabled: modify variance thresholds, modify business/social network KPIs (e.g., define new KPIs, update/delete KPIs, etc), modify marketing plan or marketing plan goals, suspend/terminate marketing plan, etc.

Figure 2:
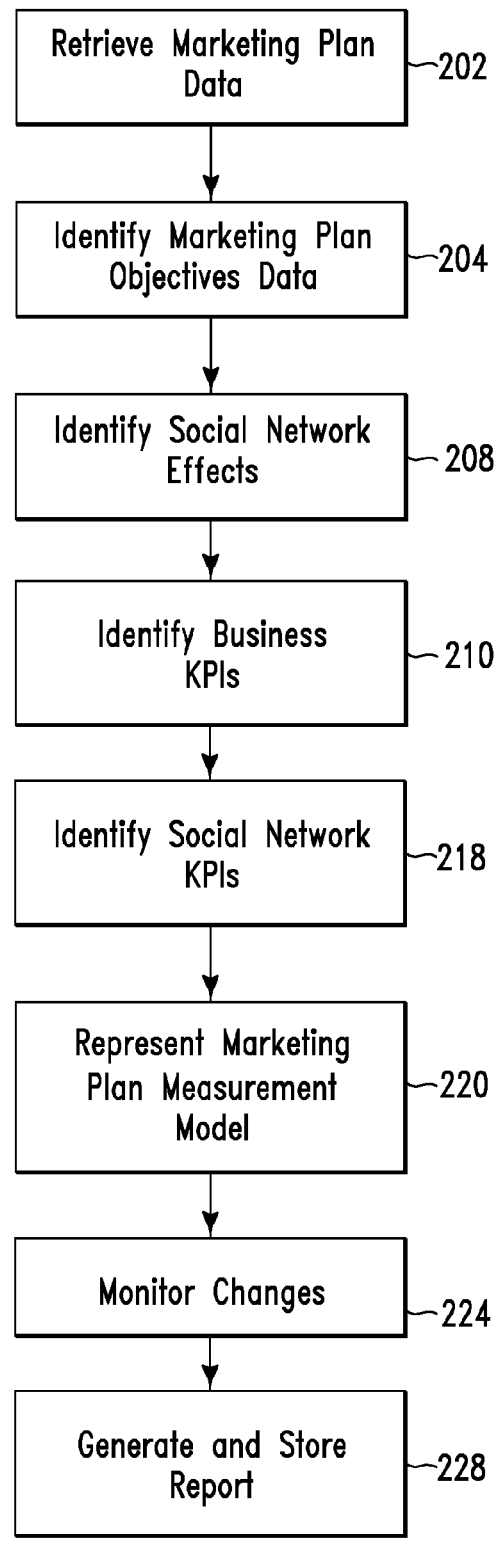
FIG. 2 illustrates a flowchart describing an algorithm used by the system of FIG. 1 for measuring and monitoring a social network marketing plan, in accordance with embodiments of the present invention.

FIG. 2 illustrates a flowchart describing an algorithm used by system 5 of FIG. 1 for measuring and monitoring a social network marketing plan, in accordance with embodiments of the present invention. In step 202, a computing system (e.g., computing system 10 of FIG. 1), retrieves marketing plan data associated with social networks. In step 204, the computing system identifies marketing plan objectives data. In step 208, the computing system identifies (i.e., based on the marketing plan data and the marketing plan objectives data) social network effects associated with marketing plan objective (i.e., of the marketing plan objectives data). In step 210, the computing system identifies business key performance indicators (KPIs) associated with the marketing plan objectives. In step 218, the computing system identifies social network KPIs associated with the social network effects. In step 220, the computing system represents a marketing plan measurement model comprising a mathematical relationship between the business KPIs and the social network KPIs. In step 224, the computing system monitors changes associated with the business KPIs and the social network KPIs. In step 228, the computing system generates and stores a report indicating the changes associated with the business KPIs and the social network KPIs.

Figure 3:
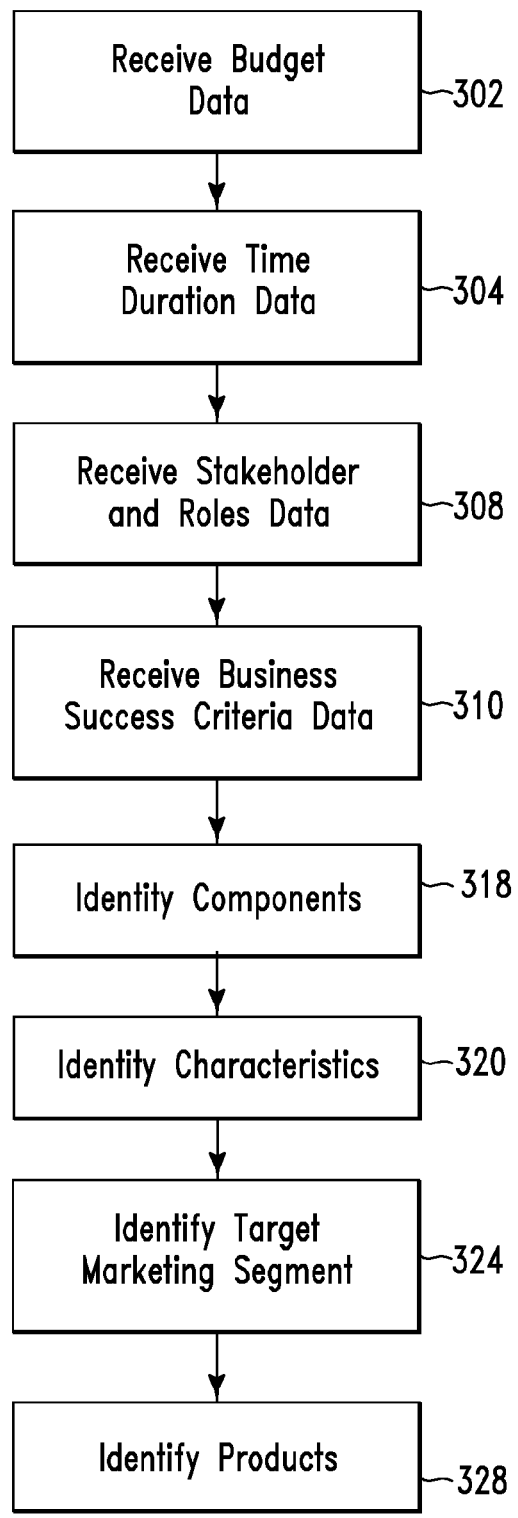
FIG. 3 illustrates a flowchart detailing a first step of the algorithm of FIG. 2, in accordance with embodiments of the present invention.

FIG. 3 illustrates a flowchart detailing step 204 of the algorithm of FIG. 2, in accordance with embodiments of the present invention. In step 302, the computing system receives budget data associated with the marketing plan. In step 304, the computing system receives time duration data associated with implementing the marketing plan. In step 308, the computing system receives stakeholders and roles data associated with the marketing plan. In step 310, the computing system receives business success criteria data associated with the stakeholders and the marketing plan. In step 318, the computing system identifies components associated with first products associated with the marketing plan. In step 320, the computing system identifies characteristics associated with the components. In step 324, the computing system identifies a target marketing segment associated with the marketing plan. In step 328, the computing system identifies second products comprising competing products associated (i.e., competing with) with the first products.

Figure 4:
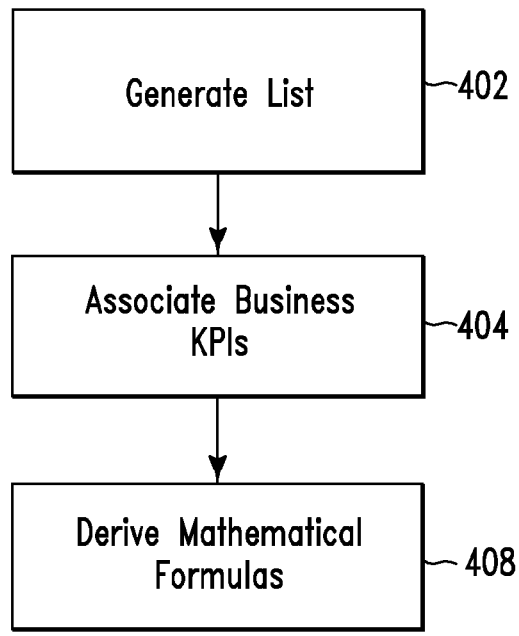
FIG. 4 illustrates a flowchart detailing a second step of the algorithm of FIG. 2, in accordance with embodiments of the present invention.

FIG. 4 illustrates a flowchart detailing step 210 of the algorithm of FIG. 2, in accordance with embodiments of the present invention. In step 402, the computing system generates a list comprising the business success criteria. In step 404, the computing system associates at least one business KPI of the business KPIs with a first business success criteria of the business success criteria. In step 408, the computing system derives mathematical formulas configured to express each business KPI in terms of a lower level business KPI.

Figure 5:
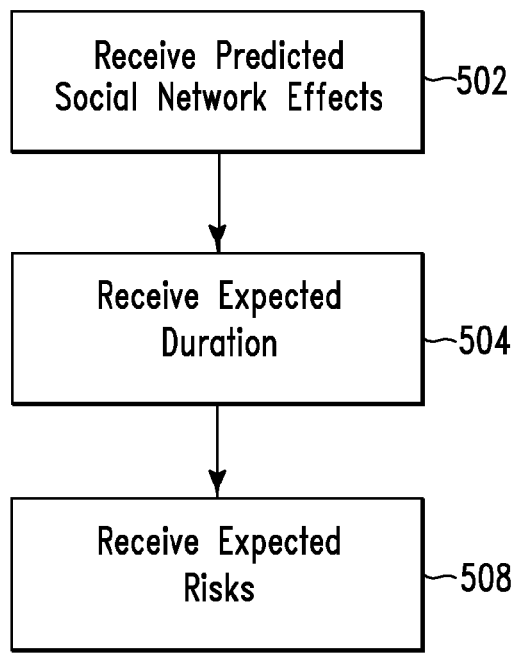
FIG. 5 illustrates a flowchart detailing a third step of the algorithm of FIG. 2, in accordance with embodiments of the present invention.

FIG. 5 illustrates a flowchart detailing step 208 of the algorithm of FIG. 2, in accordance with embodiments of the present invention. In step 502, the computing system receives predicted social network effects. In step 504, the computing system receives an expected duration for the social network effects. In step 508, the computing system receives expected risks associated with the social network effects.

Figure 6:
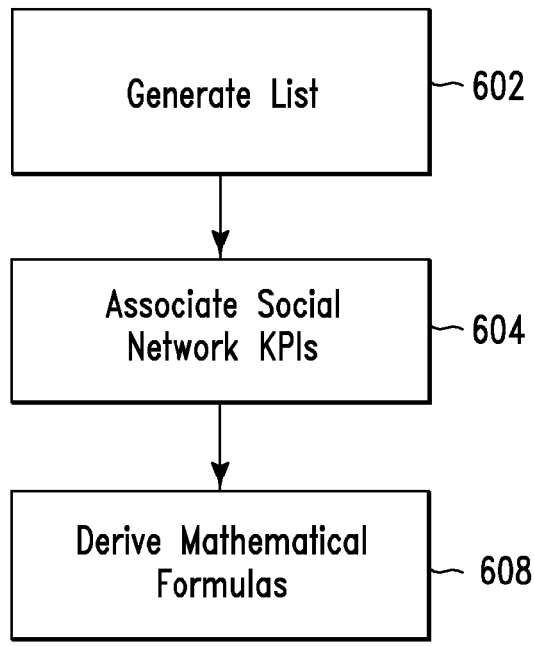
FIG. 6 illustrates a flowchart detailing a fourth step of the algorithm of FIG. 2, in accordance with embodiments of the present invention.

FIG. 6 illustrates a flowchart detailing step 218 of the algorithm of FIG. 2, in accordance with embodiments of the present invention. In step 602, the computing system generates a list comprising the predicted social network effects. In step 604, the computing system identifies at least one social network KPI associated with measuring each predicted social network effect of the predicted social network effects. In step 608, the computing system derives mathematical formulas configured to express each social network KPI in terms of a lower level social network KPI.

Figure 7:
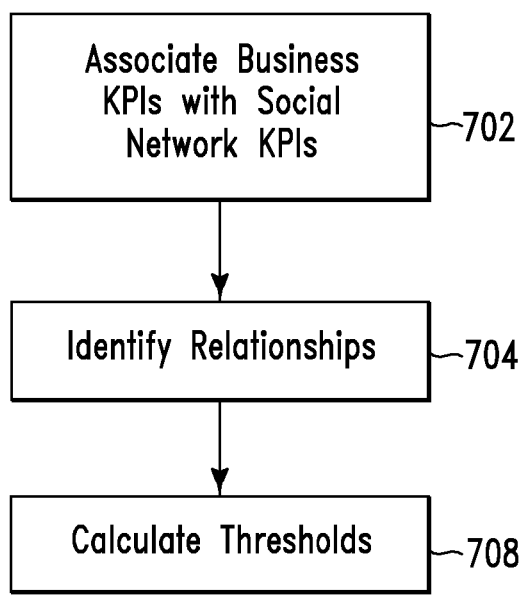
FIG. 7 illustrates a flowchart detailing a sixth step of the algorithm of FIG. 2, in accordance with embodiments of the present invention.

FIG. 7 illustrates a flowchart detailing step 220 of the algorithm of FIG. 2, in accordance with embodiments of the present invention. In step 702, the computing system associates the business KPIs with the social network KPIs. In step 704, the computing system identifies relationships between the business KPIs and the social network KPIs. In step 708, the computing system calculates variance thresholds associated with the business KPIs and the social network KPIs.

Figure 8:
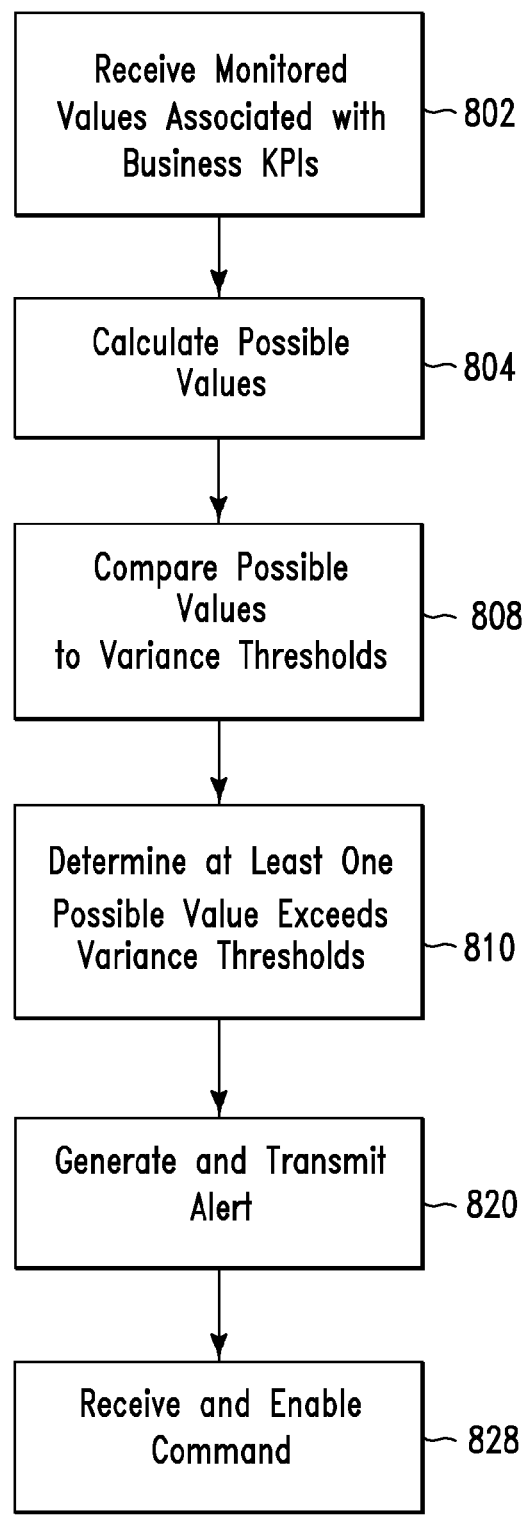
FIG. 8 illustrates a flowchart detailing a first embodiment for a seventh step of the algorithm of FIG. 2, in accordance with embodiments of the present invention.

FIG. 8 illustrates a flowchart detailing a first embodiment associated with step 224 of the algorithm of FIG. 2, in accordance with embodiments of the present invention. In step 802, the computing system receives monitored values associated with the business KPIs. In step 804, the computing system calculates (i.e., based on the monitored values) first possible values for the social network KPIs. In step 808, the computing system compares the first possible values to first associated variance thresholds of the variance thresholds. In step 810, the computing system determines (i.e., based on results of step 808) that at least one value of the first possible values exceeds an associated variance threshold. In step 820, the computing system generates and transmits (i.e., to a user) an alert indicating the least one value exceeds the associated variance threshold. In step 828, the computing system receives (i.e., from the user in response to the alert) a command for modifying the variance thresholds, the social network KPIs, and/or the marketing plan.

Figure 9:
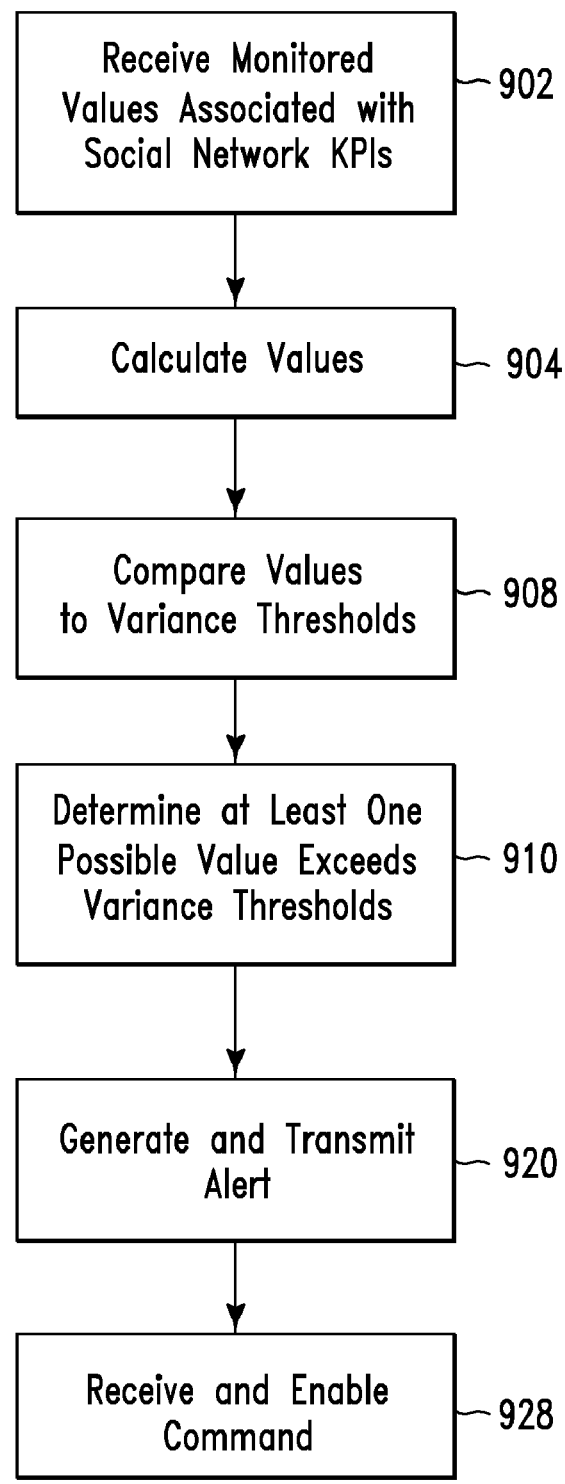
FIG. 9 illustrates a flowchart detailing a second embodiment for the seventh step of the algorithm of FIG. 2, in accordance with embodiments of the present invention.

FIG. 9 illustrates a flowchart detailing a second embodiment associated with step 224 of the algorithm of FIG. 2, in accordance with embodiments of the present invention. In step 902, the computing system receives monitored values associated with the social network KPIs. In step 904, the computing system calculates (i.e., based on the monitored values) first possible values for the business KPIs. In step 908, the computing system compares the first possible values to first associated variance thresholds of the variance thresholds. In step 910, the computing system determines (i.e., based on results of step 908) that at least one value of the first possible values exceeds an associated variance threshold. In step 920, the computing system generates and transmits (i.e., to a user) an alert indicating the least one value exceeds the associated variance threshold. In step 928, the computing system receives (i.e., from the user in response to the alert) a command for modifying the variance thresholds, the business KPIs, and/or the marketing plan.

Figure 10:
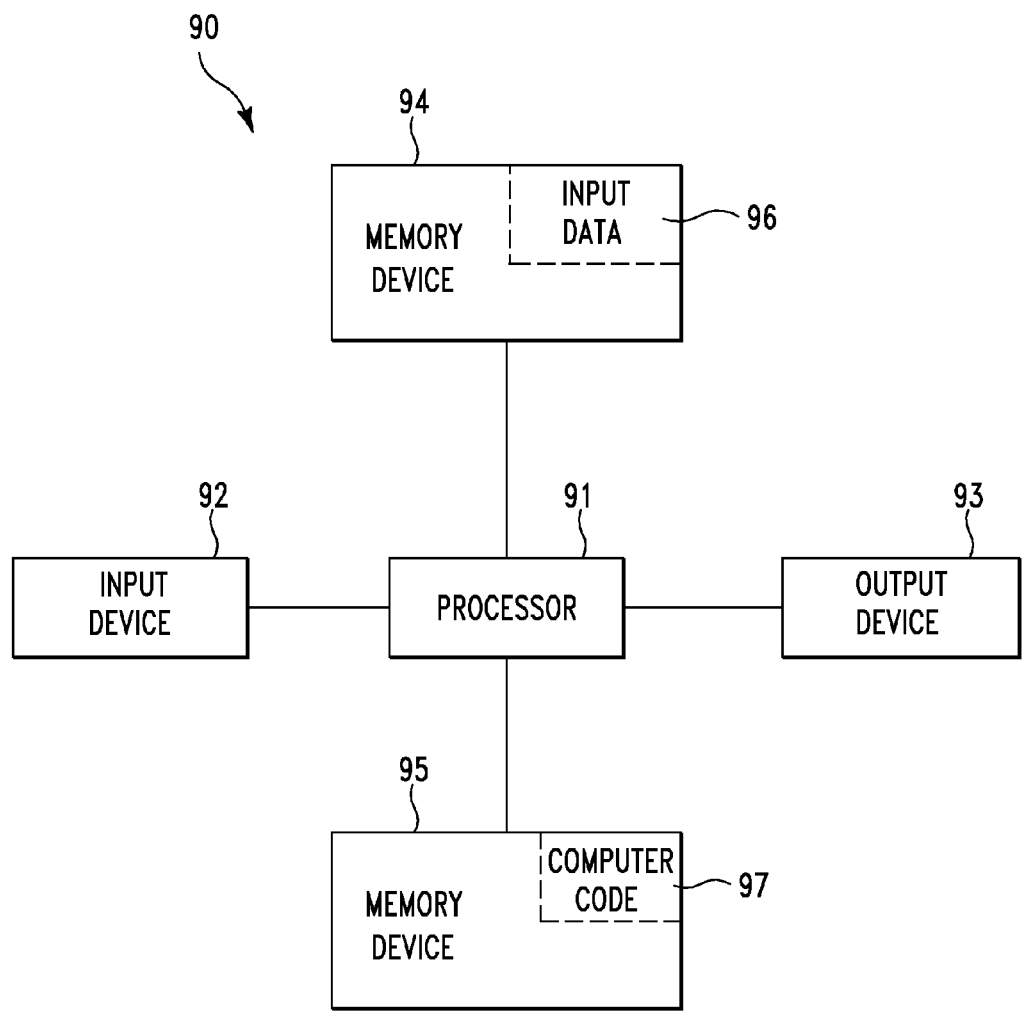
FIG. 10 illustrates a computer apparatus used for measuring and monitoring a social network marketing plan, in accordance with embodiments of the present invention.

FIG. 10 illustrates a computer apparatus 90 (e.g., computing system 10 of FIG. 1) used for measuring and monitoring a social network marketing plan, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2-9) for measuring and monitoring a social network marketing plan. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 10) may comprise the algorithms of FIGS. 2-9 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to measure and monitor a social network marketing plan. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for measuring and monitoring a social network marketing plan. In another embodiment, the invention provides a method that performs the process steps of the invention on a subscription, advertising, and/or fee basis. That is, a service provider, such as a Solution Integrator, could offer to measure and monitor a social network marketing plan. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 10 shows the computer system 90 as a particular configuration of hardware and software, any configuration of hardware and software, as would be known to a person of ordinary skill in the art, may be utilized for the purposes stated supra in conjunction with the particular computer system 90 of FIG. 10. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:
1. A method comprising:
retrieving, by a computer processor of a computing system, first data associated with a marketing plan associated with social networks;

identifying, by said computer processor, second data associated with marketing plan objectives;
identifying, by said computer processor based on said first data and said second data, social network effects associated with said marketing plan objectives, wherein said social network effects comprise effects observed in social networks of people as direct and indirect effects of announcing and implementing marketing plans, and wherein said identifying said social network effects comprises:
  receiving, by said computer processor, predicted social network effects;
  receiving, by said computer processor, an expected duration for said social network effects; and
  receiving, by said computer processor, expected risks associated with said social network effects;
identifying, by said computer processor, business key performance indicators (KPIs) associated with said marketing plan objectives;
identifying, by said computer processor, social network KPIs associated with said social network effects, wherein said identifying said social network KPIs comprises:
  generating, by said computer processor, a list comprising said predicted social network effects;
  identifying, by said computer processor, at least one social network KPI of said social network KPIs associated with measuring each predicted social network effect of said predicted social network effects;
  defining, by said computer processor, an algorithm to calculate each social network KPI of said social network KPIs;
  combining, by said computer processor, multiple social network KPIs of said social network KPIs to form higher level KPIs; and
  deriving, by said computer processor, mathematical formulas configured to express each said social network KPI of said social network KPIs in terms of a lower level social network KPI;
increasing, by said computer processor, a weighting of edges between nodes of said social networks;
identifying, by said computer processor, fixed relationships, proportional relationships, variable relationships, and expressional relationships between said business KPIs and said social network KPIs;
representing, by said computer processor, a marketing plan measurement model comprising a mathematical relationship between said business KPIs and said social network KPIs;
monitoring, by said computer processor, changes associated with said business KPIs and said social network KPIs;
generating, by said computer processor, a report indicating said changes; and
storing, by said computer processor, said report.

2. The method of claim 1, wherein said identifying said second data associated with said marketing plan objectives comprises:
  receiving, by said computer processor, budget data associated with said marketing plan;
  receiving, by said computer processor, time duration data associated with implementing said marketing plan;
  receiving, by said computer processor, stakeholders and roles data associated with said marketing plan;
  receiving, by said computer processor, business success criteria data associated with said stakeholders and said marketing plan;
  identifying, by said computer processor, components associated with first products associated with said marketing plan;
  identifying, by said computer processor, characteristics associated with said components;
  identifying, by said computer processor, a target marketing segment associated with said marketing plan; and
  identifying, by said computer processor, second products comprising competing products associated with said first products.

3. The method of claim 2, wherein said identifying said business KPIs comprises:
  generating, by said computer processor, a list comprising said business success criteria;
  associating, by said computer processor, at least one business KPI of said business KPIs with a first business success criteria of said business success criteria; and
  deriving, by said computer processor, mathematical formulas configured to express each business KPI of said business KPIs in terms of a lower level business KPI.

4. The method of claim 1, wherein said representing said marketing plan measurement model comprises:
  associating, by said computer processor, said business KPIs with said social network KPIs; and
  calculating, by said computer processor, variance thresholds associated with said business KPIs and said social network KPIs.

5. The method of claim 4, wherein said monitoring said changes comprises:
  receiving, by said computer processor, monitored values associated with said business KPIs;
  calculating, by said computer processor based on said monitored values, first possible values for said social network KPIs;
  first comparing, by said computer processor, said first possible values to first associated variance thresholds of said variance thresholds; and
  first determining, by said computer processor based on said first comparing, if any of said first possible values exceed any of said first associated variance thresholds.

6. The method of claim 5, wherein said first determining determines that at least one value of said first possible values exceeds an associated variance threshold of said first associated variance thresholds, and wherein said method further comprises:
  generating, by said computer processor, an alert indicating that said at least one value exceeds said associated variance threshold; and
  transmitting, by said computer processor to a user, said alert.

7. The method of claim 6, further comprising:
  receiving, by said computer processor from said user in response to said alert, a command for modifying said variance thresholds, said social network KPIs, and/or said marketing plan.

8. The method of claim 4, wherein said monitoring said changes comprises:
  receiving, by said computer processor, monitored values associated with said social network KPIs;
  calculating, by said computer processor based on said monitored values, first possible values for said business KPIs;
  first comparing, by said computer processor, said first possible values to first associated variance thresholds of said variance thresholds; and first determining, by said computer processor based on said first comparing, if any of said first possible values exceed any of said first associated variance thresholds.

9. The method of claim 8, wherein said first determining determines that at least one value of said first possible values exceeds an associated variance threshold of said first associated variance thresholds, and wherein said method further comprises:
   generating, by said computer processor, an alert indicating that said at least one value exceeds said associated variance threshold; and
   transmitting, by said computer processor to a user, said alert.

10. The method of claim 9, further comprising:
   receiving, by said computer processor from said user in response to said alert, a command for modifying said variance thresholds, said business KPIs, and/or said marketing plan.

11. A process for supporting computer infrastructure, said process comprising providing at least one support service for at least one of creating, integrating, hosting, maintaining; deploying computer-readable code in a computing system, wherein the code in combination with said computing system is capable of performing support services upon being executed by a computer processor of said computing system; and performing said support services by implementing steps of:
   retrieving, by a computer processor of a computing system, first data associated with a marketing plan associated with social networks;
   identifying, by said computer processor, second data associated with marketing plan objectives;
   identifying, by said computer processor based on said first data and said second data, social network effects associated with said marketing plan objectives, wherein said social network effects comprise effects observed in social networks of people as direct and indirect effects of announcing and implementing marketing plans, and wherein said identifying said social network effects comprises:
      receiving, by said computer processor, predicted social network effects;
      receiving, by said computer processor, an expected duration for said social network effects: and
      receiving, by said computer processor, expected risks associated with said social network effects;
   identifying, by said computer processor, business key performance indicators (KPIs) associated with said marketing plan objectives;
   identifying, by said computer processor, social network KPIs associated with said social network effects, wherein said identifying said social network KPIs comprises:
      generating, by said computer processor, a list comprising said predicted social network effects;
      identifying, by said computer processor, at least one social network KPI of said social network KPIs associated with measuring each predicted social network effect of said predicted social network effects;
      defining, by said computer processor, an algorithm to calculate each social network KPI of said social network KPIs;
      combining, by said computer processor, multiple social network KPIs of said social network KPIs to form higher level KPIs; and
      deriving, by said computer processor, mathematical formulas configured to express each said social network KPI of said social network KPIs in terms of a lower level social network KPI;
   increasing, by said computer processor, a weighting of edges between nodes of said social networks;
   identifying, by said computer processor, fixed relationships, proportional relationships, variable relationships, and expressional relationships between said business KPIs and said social network KPIs;
   representing, by said computer processor, a marketing plan measurement model comprising a mathematical relationship between said business KPIs and said social network KPIs;
   monitoring, by said computer processor, changes associated with said business KPIs and said social network KPIs;
   generating, by said computer processor, a report indicating said changes; and
   storing, by said computer processor, said report.

12. A computer program product, comprising a computer readable storage device storing a computer readable program code, said computer readable program code configured to perform a method upon being executed by a processor of computing system, said method comprising:
   retrieving, by a computer processor of a computing system, first data associated with a marketing plan associated with social networks;
   identifying, by said computer processor, second data associated with marketing plan objectives;
   identifying, by said computer processor based on said first data and said second data, social network effects associated with said marketing plan objectives, wherein said social network effects comprise effects observed in social networks of people as direct and indirect effects of announcing and implementing marketing plans, and wherein said identifying said social network effects comprises:
      receiving, by said computer processor, predicted social network effects;
      receiving, by said computer processor, an expected duration for said social network effects; and
      receiving, by said computer processor, expected risks associated with said social network effects;
   identifying, by said computer processor, business key performance indicators (KPIs) associated with said marketing plan objectives;
   identifying, by said computer processor, social network KPIs associated with said social network effects, wherein said identifying said social network KPIs comprises:
      generating, by said computer processor, a list comprising said predicted social network effects;
      identifying, by said computer processor, at least one social network KPI of said social network KPIs associated with measuring each predicted social network effect of said predicted social network effects;
      defining, by said computer processor, an algorithm to calculate each social network KPI of said social network KPIs;
      combining, by said computer processor, multiple social network KPIs of said social network KPIs to form higher level KPIs; and
      deriving, by said computer processor, mathematical formulas configured to express each said social network KPI of said social network KPIs in terms of a lower level social network KPI;

increasing, by said computer processor, a weighting of edges between nodes of said social networks;

identifying, by said computer processor, fixed relationships, proportional relationships, variable relationships, and expressional relationships between said business KPIs and said social network KPIs;

representing, by said computer processor, a marketing plan measurement model comprising a mathematical relationship between said business KPIs and said social network KPIs;

monitoring, by said computer processor, changes associated with said business KPIs and said social network KPIs;

generating, by said computer processor, a report indicating said changes; and storing, by said computer processor, said report.

13. A computing system comprising a computer processor coupled to a computer-readable memory unit, said memory unit containing instructions that when enabled by the processor implement a monitoring method comprising;

retrieving, by said computer processor, first data associated with a marketing plan associated with social networks;

receiving, by said computer processor, second data associated with marketing plan objectives, identifying, by said computer processor based on said first data and said second data, social network effects associated with said marketing plan objectives, wherein said social network effects comprise effects observed in social networks of people as direct and indirect effects of announcing and implementing marketing plans, and wherein said identifying said social network effects comprises:
  receiving, by said computer processor, predicted social network effects;
  receiving, by said computer processor, an expected duration for said social network effects; and
  receiving, by said computer processor, expected risks associated with said social network effects;

identifying, by said computer processor, business key performance indicators (KPIs) associated with said marketing plan objectives;

identifying, by said computer processor, social network KPIs associated with said social network effects, wherein said identifying said social network KPIs comprises:
  generating, by said computer processor, a list comprising said predicted social network effects;
  identifying, by said computer processor, at least one social network KPI of said social network KPIs associated with measuring each predicted social network effect of said predicted social network effects;
  defining, by said computer processor, an algorithm to calculate each social network KPI of said social network KPIs;
  combining, by said computer processor, multiple social network KPIs of said social network KPIs to form higher level KPIs; and
  deriving, by said computer processor, mathematical formulas configured to express each said social network KPI of said social network KPIs in terms of a lower level social network KPI;

increasing, by said computer processor, a weighting of edges between nodes of said social networks;

identifying, by said computer processor, fixed relationships, proportional relationships, variable relationships, and expressional relationships between said business KPIs and said social network KPIs;

representing, by said computer processor, a marketing plan measurement model comprising a mathematical relationship between said business KPIs and said social network KPIs;

monitoring, by said computer processor, changes associated with said business KPIs and said social network KPIs;

generating, by said computer processor, a report indicating said changes; and storing, by said computer processor, said report.

14. The computing system of claim 13, wherein said identifying said marketing plan objectives comprises:
  receiving, by said computer processor, budget data associated with said marketing plan;
  receiving, by said computer processor, time duration data for implementing said marketing plan;
  receiving, by said computer processor, stakeholders and roles data associated with said marketing plan;
  receiving, by said computer processor, business success criteria data associated with said stakeholders and said marketing plan;
  identifying, by said computer processor, components associated with first products associated with said marketing plan;
  identifying, by said computer processor, characteristics associated with said components;
  identifying, by said computer processor, a target marketing segment associated with said marketing plan; and
  identifying, by said computer processor, second products comprising competing products associated with said first products.

15. The computing system of claim 14, wherein said identifying said business KPIs comprises:
  generating, by said computer processor, a list comprising said business success criteria;
  associating, by said computer processor, at least one business KPI of said business KPIs with a first business success criteria of said business success criteria; and
  deriving, by said computer processor, mathematical formulas configured to express each business KPI of said business KPIs in terms of a lower level business KPI.

* * * * *